(12) United States Patent
Carnevale

(10) Patent No.: US 6,430,648 B1
(45) Date of Patent: Aug. 6, 2002

(54) ARRANGING ADDRESS SPACE TO ACCESS MULTIPLE MEMORY BANKS

(75) Inventor: Michael Joseph Carnevale, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/478,038

(22) Filed: Jan. 5, 2000

(51) Int. Cl.[7] .............................................. G06F 12/00
(52) U.S. Cl. ........................... 711/5; 711/172; 711/202
(58) Field of Search ............................ 711/5, 170, 171, 711/172, 173, 202

(56) References Cited

U.S. PATENT DOCUMENTS

| | | | |
|---|---|---|---|
| 5,012,408 A | 4/1991 | Conroy | 365/200 |
| 5,392,252 A | 2/1995 | Rimpo et al. | 365/230.02 |
| 5,452,257 A | 9/1995 | Han | 365/230.03 |
| 5,553,023 A | 9/1996 | Lau et al. | 365/189.01 |
| 5,619,471 A | 4/1997 | Nunziata | 365/230.03 |
| 5,684,973 A | 11/1997 | Sullivan et al. | 395/405 |
| 5,708,597 A | 1/1998 | Kelem | 365/230.03 |
| 5,774,135 A | 6/1998 | Letham | 345/516 |

Primary Examiner—Kevin Verbrugge
(74) Attorney, Agent, or Firm—Karuna Ojanen

(57) ABSTRACT

An improved and much simplified method to address memory space having multiple memory banks in memory such as those in computer systems. The method provides absolute addressing and treats the memory as one large memory but logically divides the memory into banks. Data is not stored consecutively. Bank select logic reads the address bits that are of higher order than the size of the smallest memory bank. Address generation logic reads those address bits that are of lower order than the size of the selected bank.

5 Claims, 7 Drawing Sheets

ARRANGING ADDRESS SPACE TO ACCESS MULTIPLE MEMORY BANKS

TECHNICAL FIELD

This invention relates generally to the field of electronic memory management and more particularly, relates to a method to improve performance of memory subsystems by arranging address space to access multiple memory banks as if it were one contiguous memory.

BACKGROUND OF THE INVENTION

The endeavor for faster and faster computers have reached remarkable milestones since their inception and coming of age during the past sixty years. The beginning of the computer age was characterized by connecting vacuum tubes with large coaxial cables for wiring analog logic. If a new problem was to be solved, the cables were reconfigured. Today, coaxial cables have been replaced with high speed data buses; vacuum tubes have been replaced with high speed logic having transistors of new semiconductor materials and designs, all of which are limited only by the laws of physics.

Initially, the slowest subsystem of computers was the processor subsystem. As processors became more efficient, the limiting function of the computer became the time required to obtain data from sources outside the computer. Once data was moved into the computer, the limitation became the time required for the computer processor to retrieve data stored in memory subsystems external to the processor.

To improve the performance of memory subsystems, memory was brought closer to the processor in the form of cache hierarchies. Cache hierarchies, which are nothing more than limited volume high-speed memories were incorporated into the same integrated circuit as the processor. Thus, data would be immediately available to the processor but the bulk of the data and operating programs was still stored in a larger memory within the computer, referred to as main memory. Efforts were directed toward accessing this main memory subsystem faster and more efficiently. New faster semiconductor materials were developed and used in the RAM—random access memory. More efficient circuits and methods of row and column addressing were developed. The main memory was connected to the processor and other I/O devices through more efficient buses and sophisticated bus command logic. Soon memory control logic became almost as complicated as the logic within the central processing unit having the processor and the cache hierarchy. Memory refresh circuits were developed to maintain the "freshness" and hence the accuracy of the data within main memory. Compression/decompression engines were developed to efficiently rearrange stored data in memory banks.

Still other techniques to improve memory subsystem performance include overlapping and interleaving commands to the memory devices. The amount of data processed with each access to memory was increased to improve memory bus utilization. Interleaving to route commands on different memory buses or different memory cards was improved by providing additional memory in the form of multiple devices or multiple memory banks.

Accessing the multiple memory banks became an art in and of itself. Memory in a computer system may now consist of memory banks of multiple memory cards in which the memory banks can be different sizes, especially when additional memory is added after manufacture of a computer system. One method of accessing memory and keeping track of the address in memory of necessary information is using contiguous memory. Contiguous memory access occurs when after the last byte of one memory bank is accessed, the very first byte of the next memory bank is accessed. When memory is physically maintained contiguously, however, address generation for multiple memory banks of various sizes is complicated and adds timing delays because the hardware that generates the address to the memory banks must subtract all other memory bank sizes preceding the memory bank that is currently being accessed. Memory bank address generation is greatly simplified when the view of physical memory is non-contiguous, i.e., the address space within the memory banks are broken into non-contiguous sections.

There remains a need to simplify access to memory subsystems without additional cost and additional hardware to maintain a complex address space in memory while still maintaining high bandwidth and high data bus utilization.

SUMMARY OF THE INVENTION

These needs and others that will become apparent to one skilled in the art are satisfied by a method to arrange addresses in a memory system, comprising the steps of: storing the total size of a plurality of contiguous memory banks and storing the size of each of said memory banks; selecting one of the memory banks by reading the highest order bits above the bits representative of the size of the smallest memory bank; and determining an offset position of an address in the selected memory bank from the physical beginning of the selected memory bank by summing the bits of lower order than the bit representing the size of the selected memory bank.

If the highest order bits above the bit representative of the size of the smallest memory bank are zero, then the address is placed in the first memory bank. Quite simply, the memory bank selected is the one whose low address is less than or equal to the highest order bits and whose high address is greater than the highest order bits.

The invention may also be considered a computer system, comprising a computer processor, a memory connected on a bus to the processor; the memory comprising a memory controller connected on a memory bus to a plurality of contiguous memory banks, each having a low address, a high address, and a physical beginning. The memory controller has a plurality of registers which store the size of each memory bank in which the registers are used by bank select logic and address generation logic. The computer system also has a plurality of bus units connected to the processor and/or the memory via an external bus and the processor and or one of the bus units to request access to an address in said memory wherein the requested address is decoded by the bank select logic which reads the address bits that are of higher order than the size of the smallest memory bank and selects the memory bank whose low address is less than or equal to the requested address and whose high address is greater than the requested address; and wherein the address generation logic generates a position in the selected memory bank by summing the address bits of lower significance than the size of the selected bank and offsetting the sum from the physical beginning of the selected bank.

Another aspect of the invention is a memory system apparatus for the storage of and retrieval of binary data, comprising a means to read a requested binary address to access the memory system having a plurality of memory banks, each bank having a low address not necessarily coincident with the physical beginning of the memory bank and a high address; means to decode the bits of the binary address that are of higher order than the smallest of the memory banks in the memory system; means to select the memory banks whose low address is less than or equal to the higher order bits and whose high address is greater than the higher order bits; means to decode the bits of the binary address that are lower order than the bits representing the size of the selected memory bank; means to offset the requested binary address from the physical beginning of the selected memory bank by summing the bits of lower order; and means to store data to or retrieve data from the offset in the selected memory bank.

Further scope of applicability of the present invention will become apparent from the detailed description given herein. It should be understood, however, that the detailed description and the specific examples, while indicating preferred embodiments of the invention, are given by way of illustration only. Various changes and modifications within the spirit and scope of the invention will become apparent to those skilled in the art upon review of the detailed description.

BRIEF DESCRIPTION OF THE DRAWING

The present invention will become more fully understood from the detailed description and accompanying drawings, wherein.

DETAILED DESCRIPTION OF THE PREFERRED EMBODIMENT

Figure 1:
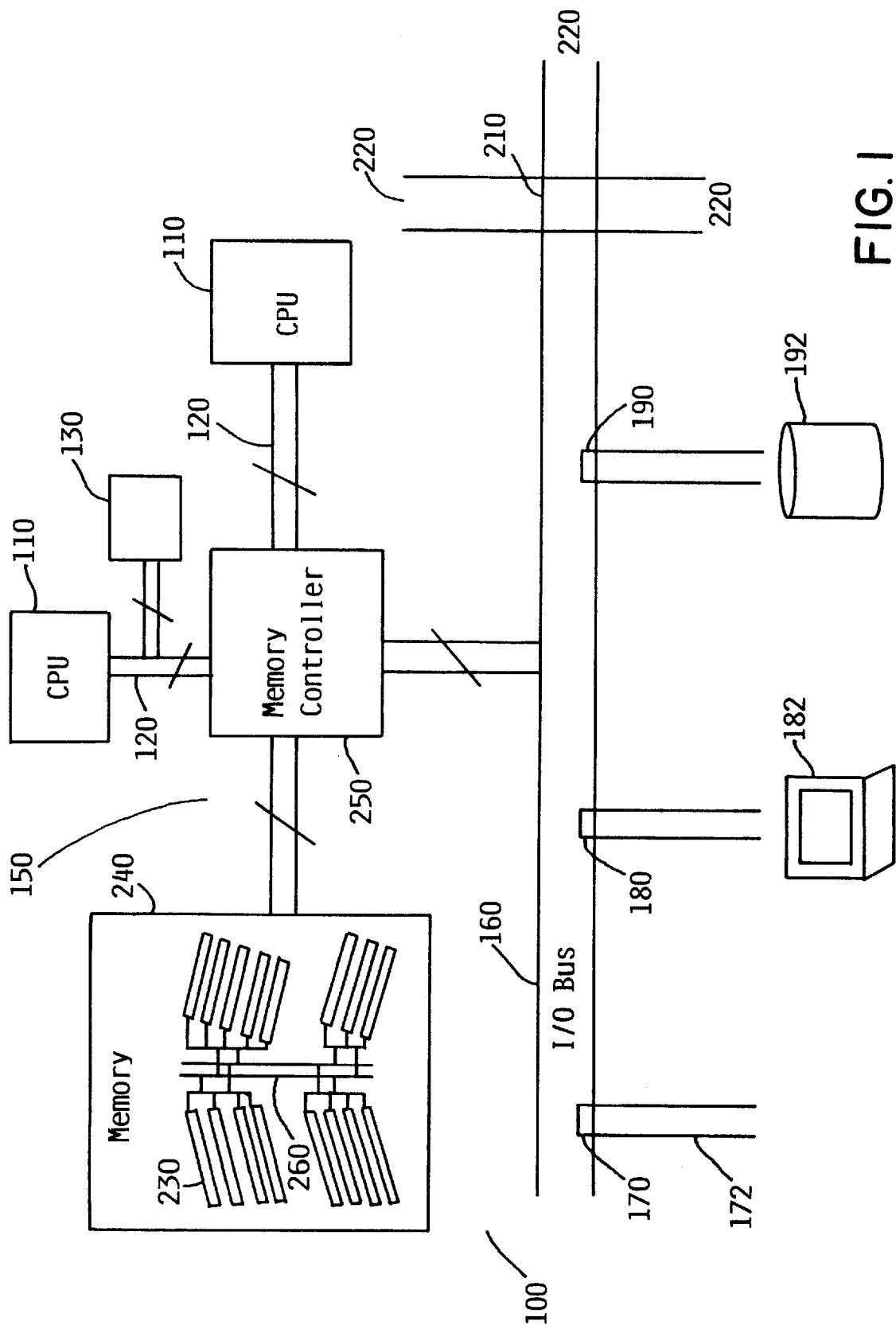
FIG. 1 is a simplified block diagram of a basic memory subsystem incorporating a computer processor which is capable of implementing the invention.

Referring to the figures wherein like numerals refer to the same or similar elements throughout and in particular with reference to FIG. 1, a simplified block diagram of a computer information processing system 100 incorporating a memory subsystem 150 and a computer processor 110 which may operate in accordance with principles of the invention is illustrated. The computer information processing system 100 has at least one computer processor 110 having many functional units to perform operations on data via instructions. An example of a system processor is the PowerPC which uses a reduced instruction set architecture. A system processor 110 may be connected to other system processors 110 using an internal bus network 120. Connected to the system processors 110 via the internal bus 120 is a cache system 130 employing high speed memory nearer the processor 110 for the storage of data and instructions that are quickly accessed by the processor. Cache system 130 may typically comprise a level one data cache, a level two data and instruction cache and may also have intermediate caches or other level of caches to store and route data and/or instructions. Although cache system 130 is shown external to a processor 110; each processor 110 may have its own cache system 130 on the same integrated circuit. Connected to the cache system 130 is main storage memory subsystem 150.

The memory subsystem 150 typically comprises an array of memory cards referred to as main storage 240 and a memory controller 250 which interacts with the cache system 130 and, through an external bus 160, with various input/output (I/O) devices for the transfer of data and instructions. Typically within the computer information processing system 100, these I/O devices may include an I/O bus attachment 170 for communication with an external network 172 using specified protocols such as Ethernet, PCI, TCP/IP, etc. Other examples of the external network 172 include a limited-access network within a company or a specified configuration or an unlimited-access network such as the Internet. Workstation controller 180 may be connected to other computer systems which are similar to its own computer system or may be connected to a larger computer/server in which case the computer information processing system 100 would be considered a client. On the other hand and even at the same time, the computer system 100 may be configured to be a server to provide operating systems and client programs for other clients by interacting with other workstations 182 through workstation controller 180 or over the I/O bus attachment 107. Typically, the computer system 100 may also be connected to external memory storage 192, such as a disk drive or tape drive, through a storage controller 190. Examples of other functional units attached to either an internal or an external bus, herein be referred to as bus units, may include processors, I/O hub controllers, compression engines, external storage device controllers, workstation controllers, etc.

The memory system 150 is suitable for connection to a computer information processing system 100 and provides large amounts of storage to be accessed at high speed by the host computer information processing system 100. The main functional units of the memory subsystem 150 are the memory controller 250 and a plurality of random access memory cards 230 in main memory 240 in which data and programs are stored during the operation of the computer data processing system 100. Each of the memory cards 230 of memory subsystem 150 comprises an array of DRAM, SDRAM, or SRAM memory chips. The memory architecture is a hierarchy in which memory chips or modules are configured into banks. Several or many memory chips may be physically located and interconnected with each other on the same memory card. All or some of the memory cards may be interconnected on a memory bus 260, of which there may be several memory buses. Memory controller 250 manages the transfer of data and other information to and from the memory subsystem 150 at high speed and determines first which memory bus, then which memory card on that bus, then which memory chips on that memory card and lastly which memory banks on that memory card are associated with a memory command referring to an address in memory.

The memory controller 250 is connected to the system processors 110 via a bus system 120, 160 which may comprise one or more internal buses 120 and one or more external buses 160 for rapid intercommunication between the processors 110, the rest of the memory subsystem 150, I/O devices 170, and other bus units. One can easily appreciate that there may be a cache system 130 associated with and included with each system processor 110, and each system processor may communicate directly with I/O devices 170 on either or both an internal bus 120 and an external bus 160. The memory subsystem 150 of FIG. 1 may be either directly or indirectly connected not only to the workstation controller 180 and the storage controller 190, but also to a nodal interconnect 210 including a network switching fabric of local or distant processors or other memory controllers and other devices 220 having such functions as monitoring bus or other communication network traffic, compression and decompression of data which may be internal or external to the memory controller 250 and may or may not be located between storage controller 190 and memory subsystem 150. Other bus units not shown which provide memory commands to the memory controller 250 may also be provided.

Figure 2:
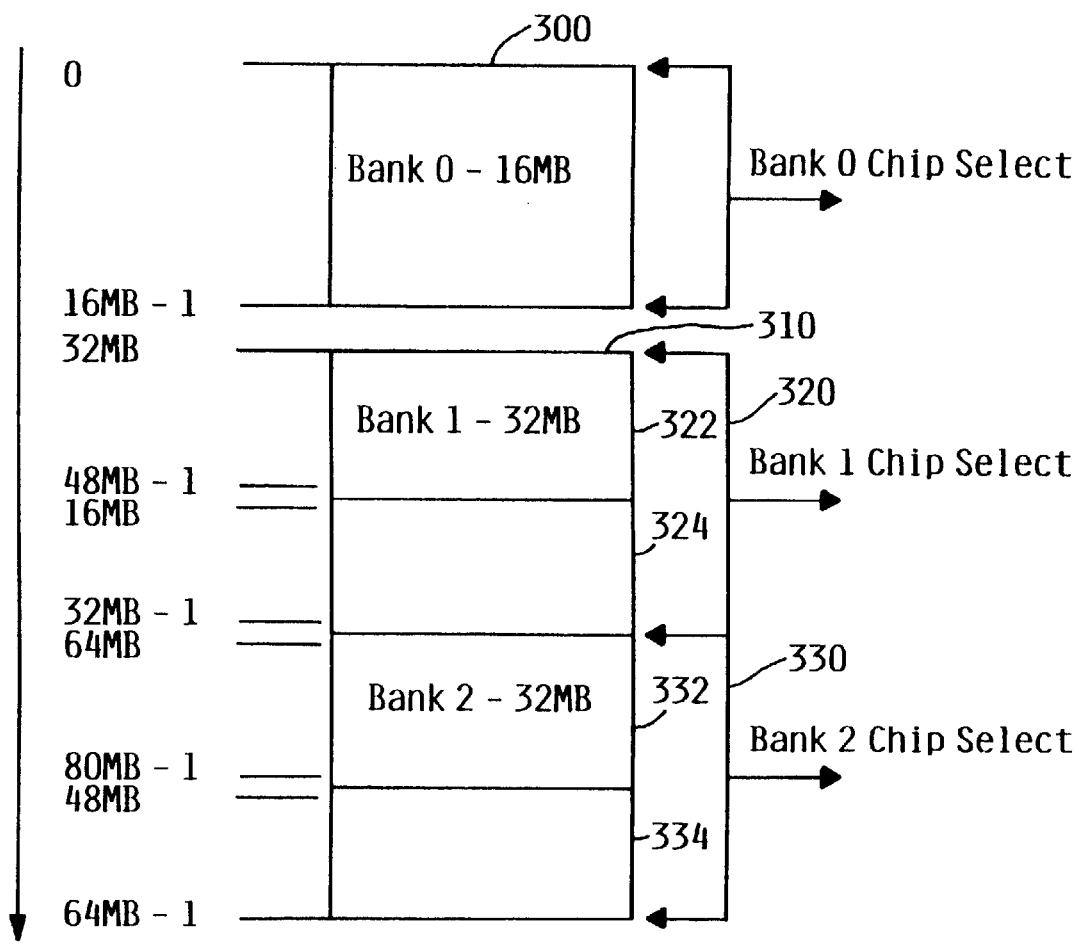
FIG. 2 is a simplified block diagram of an address map for three memory banks in a memory subsystem in accordance with principles of the invention.

FIG. 2 is a simplified diagram of an address map for two memory cards in a memory subsystem in accordance with principles of the invention. An example of a memory of eighty megabytes is shown as two dual inline memory modules (DIMMs) 300 and 310. DIMM 1 300 has sixteen megabytes of memory and has absolute addresses 0 to 16 MB−1. DIMM 2 or memory card 310 has sixty-four megabytes and is partitioned into two equal banks 320, 330 of thirty-two megabytes each, although each bank need not be partitioned equally. The access method of the invention will access Bank 0 in DIMM 1 300 first and then will read DIMM 2 310, not as a contiguous extension but as a logical extension. The next memory addresses, i.e., the low address 16 MB to address 32 MB−1, begins in the bottom half 324 of Bank 1 as if the immediately preceding memory addresses of Bank 0 were right above it in the same bank. After the sixteen megabytes of the lower half 324 of Bank 1 320 are used, data will be stored to the upper half 322 of Bank 1 320 with addresses 32 MB to high address 48 MB−1; then to the lower half 334 of Bank 2 330 with low address 48 MB to 64 MB−1; and finally to the upper half 332 of Bank 2 330 with absolute addresses 64 MB to high address 80 MB−1. Note that again the addresses in the lower half 334 of Bank 2 are in the position as if all the previous addresses were contiguously above it.

Figure 3:
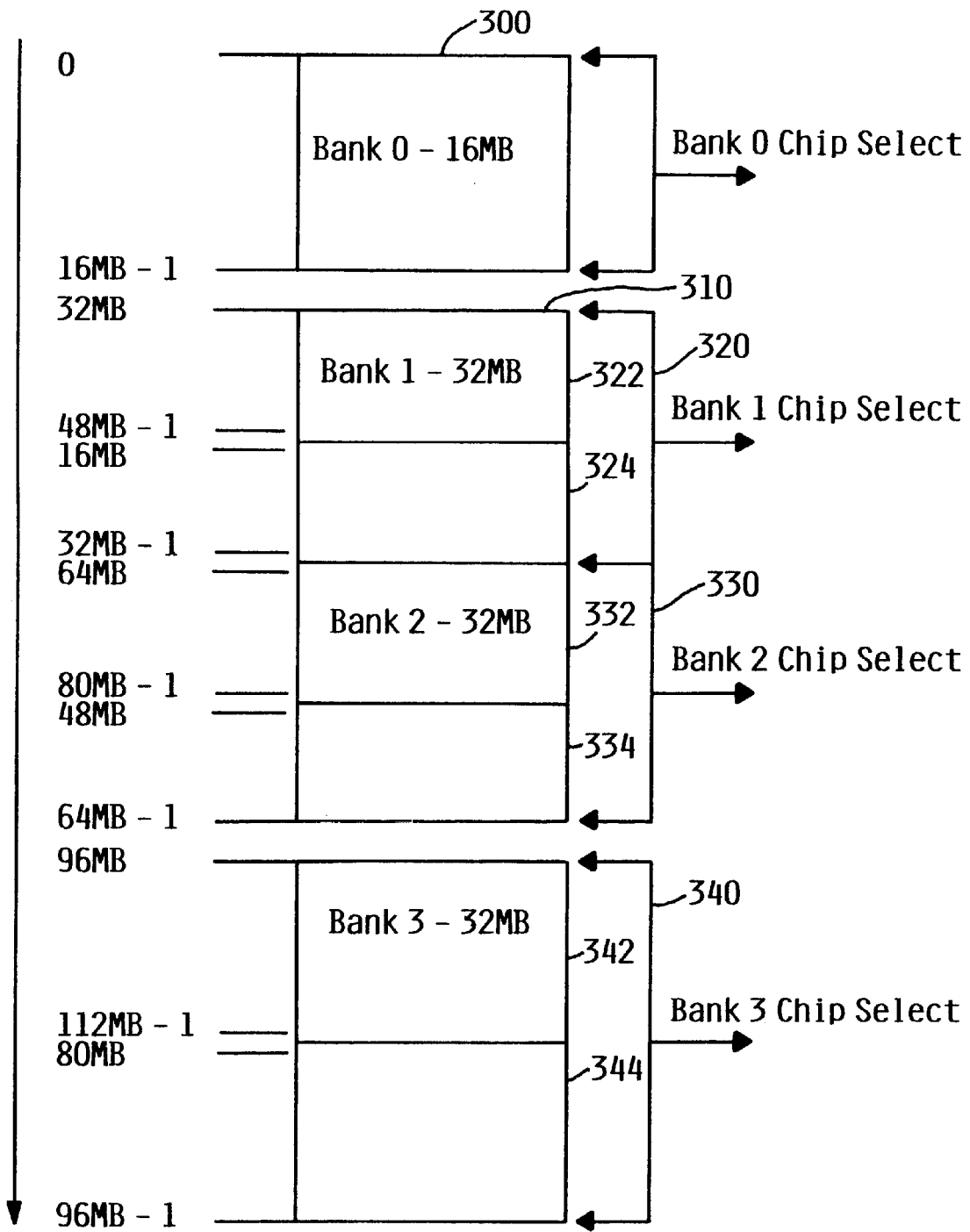
FIG. 3 is a simplified block diagram of an address map for four memory banks in a memory subsystem in accordance with principles of the invention. It is suggested that FIG. 3 be printed on the cover of the patent.

FIG. 3 extends the concept of the invention illustrated in FIG. 2 to another memory card. Memory DIMM 3 340 having 32 MB has been added and is considered one bank of thirty-two megabytes. An important concept to keep in mind is that the physical beginning of a bank is not the low address of that bank, i.e., although the banks are contiguous, the addresses within the bank are not. After DIMM 2 310 has been filled, additional data will be stored in the lower half 344 of Bank 3 340 with low address 80 MB to 96 MB−1. Then the upper half 342 of Bank 3 340 will be filled with addresses 96 MB to high address 112 MB−1.

The memory controller 250 controls the registers and the control logic to accurately and efficiently receive and transfer data and information from/to memory cards 230. The bank select logic in the memory controller 250 decodes the address to select a particular bank given an address. An example of an address decoding circuit that can be modified to accommodate the bank select logic is disclosed in U.S. Pat. No. 5,452,257 entitled, "Address Range Bank Decoding for DRAM" to Han. The information needed to decode an address is the size of memory and the size of each memory bank, both of which are stored in registers in the memory controller 250.

Figure 4A:
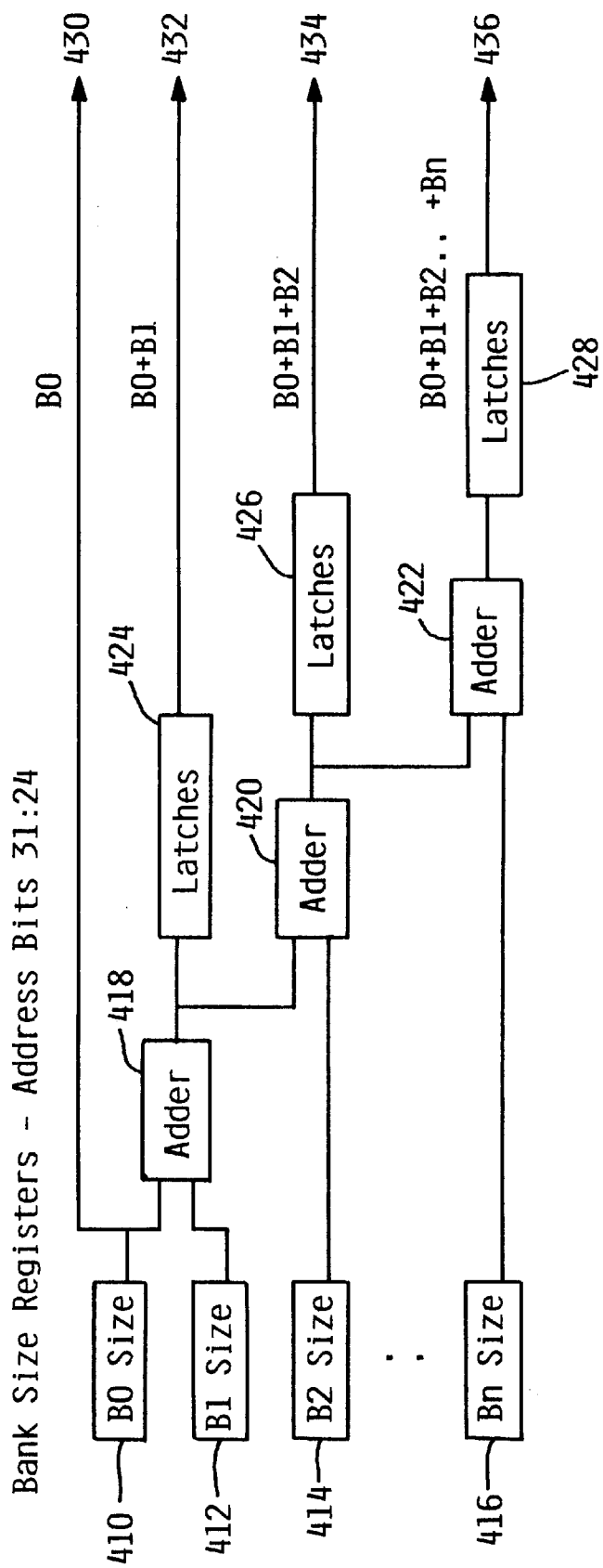
FIG. 4 is a simplified diagram of the bank select logic to select the memory bank ascribed to a memory address in a memory subsystem in accordance with principles of the invention.
Figure 4B:
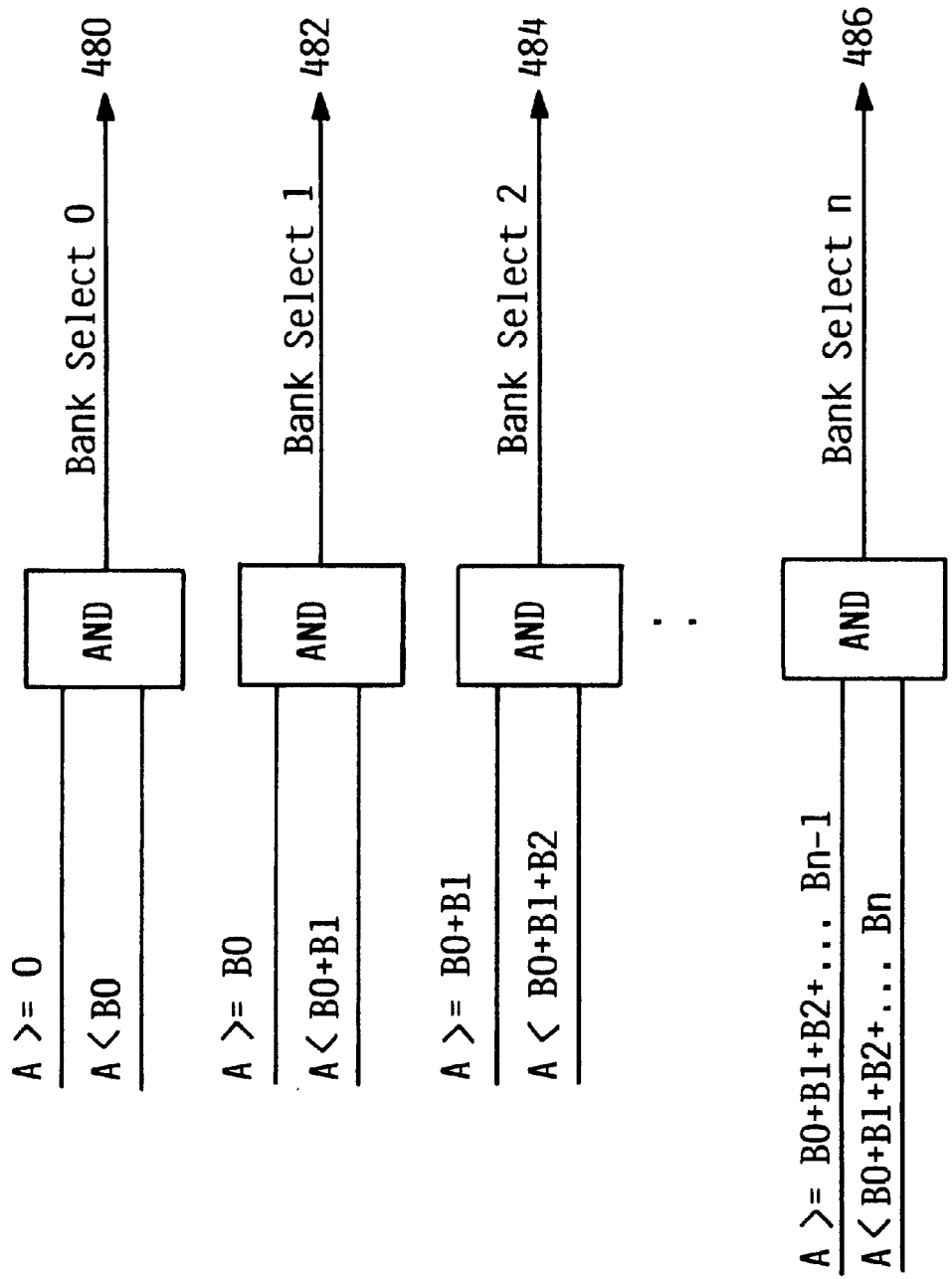

FIG. 4 provides an illustration of how the decode logic would select the bank associated with a particular address. Within the memory controller 250 there are a number of registers 410, 412, 414, 416, associated with each memory bank containing information of the size of each bank. Thus the size of Bank 0 is stored in a register 410, the size of Bank 1 is stored in register 412, etc. The registers 410, 412, 414, 416 . . . are shown connected to a plurality of adders 418, 420, 422 . . . in a staggered arrangement in which the sizes of all the banks physically located before a bank are summed. For example, the size of Bank 0 stored in register 410 and the size of Bank 1 stored in register 412 are summed in adder 418 and latched through latch 424 to be output at 432 to the bank select logic. Similarly, the size of Bank 2 is summed by adder 420 with the output of adder 410 and the sum of Bank 0+Bank 1+Bank 2 is latched through the logic at latch 426 and output at 434. Adder 422 sums the size of Bank N with the output of adder 420, i.e., the sum of Bank 0+Bank 1+Bank 2+. . . +Bank N, which is latched through latch 428 and output to the bank select logic at 436. This portion of the bank select logic is fast because there are no processing cycles involved to calculate and subtract offsets, etc.

Any address in a semiconductor memory can be represented by the number of bits indicative of the total memory, e.g., four gigabytes can be represented by thirty-two bits, bits 31:0. An address in a memory bank of a given size can be represented by the number of bits indicative of the size of that bank, e.g., 32 MB can be addressed by bits 24:0. In FIG. 2 or FIG. 3, the bank select logic need only consider bits 31:24 to determine the bank in which the address belongs because if all the bits greater than and including bit 24 are zero, the address will be in Bank 0. An address having any of bits 31:24 enabled will be in subsequent banks. The invention simply recognizes that the bits to be considered for bank selection are the higher order bits representing the total size of memory and must be higher than the bits representing the size of the first memory bank. The "cheat sheet" below is helpful to understand the relationship of the address bits to the address's position in memory.

| Bit | Memory |
| --- | --- |
| 0 | 1 byte |
| 1 | 2 |
| 2 | 4 |
| 3 | 8 |
| 4 | 16 |
| 5 | 32 |
| 6 | 64 |
| 7 | 128 |
| 8 | 256 |
| 9 | 512 |
| 10 | 1KB |
| 11 | 2KB |
| 12 | 4KB |
| 13 | 8KB |
| 14 | 16KB |
| 15 | 32KB |
| 16 | 64KB |
| 17 | 128KB |
| 18 | 256KB |
| 18 | 512KB |
| 20 | 1MB |
| 21 | 2MB |
| 22 | 4MB |
| 23 | 8MB |
| 24 | 16MB |
| 25 | 32MB |
| 26 | 64MB |
| 27 | 128MB |
| 28 | 256MB |
| 29 | 512MB |

-continued

| Bit | Memory |
|---|---|
| 30 | 1GB |
| 31 | 2GB |

If A is a 32-bit memory address generated by a processor 110 or a device attached to I/O bus 160 capable of accessing four gigabytes of semiconductor memory, and B0, B1, B2 . . . BN represents the size of memory banks 0, 1, 2, . . . N, respectively. The bank select logic simply reads those bits of A pertaining to memory greater than the size of the smallest memory bank and then selects the bank.

In FIG. 4, the bank select address does a series of logical IF and AND operation, which preferably are implemented in hardware for speed but could also be embodied in processor program, as follows:

IF (A≧0) AND IF (A<B0), output Bank Select 0 signal 480;

IF (A≧B0) AND IF (A<B0+B1), output Bank Select 1 signal 482;

IF (A≧B0+B1) AND IF (A<B0+B1+B2), output Bank Select 2 signal 484;

IF (A≧B0+B1+B2+. . . BN-1) AND IF (A<B0+B1+B2+. . . BN), output Bank Select N signal 486.

Figure 5A:
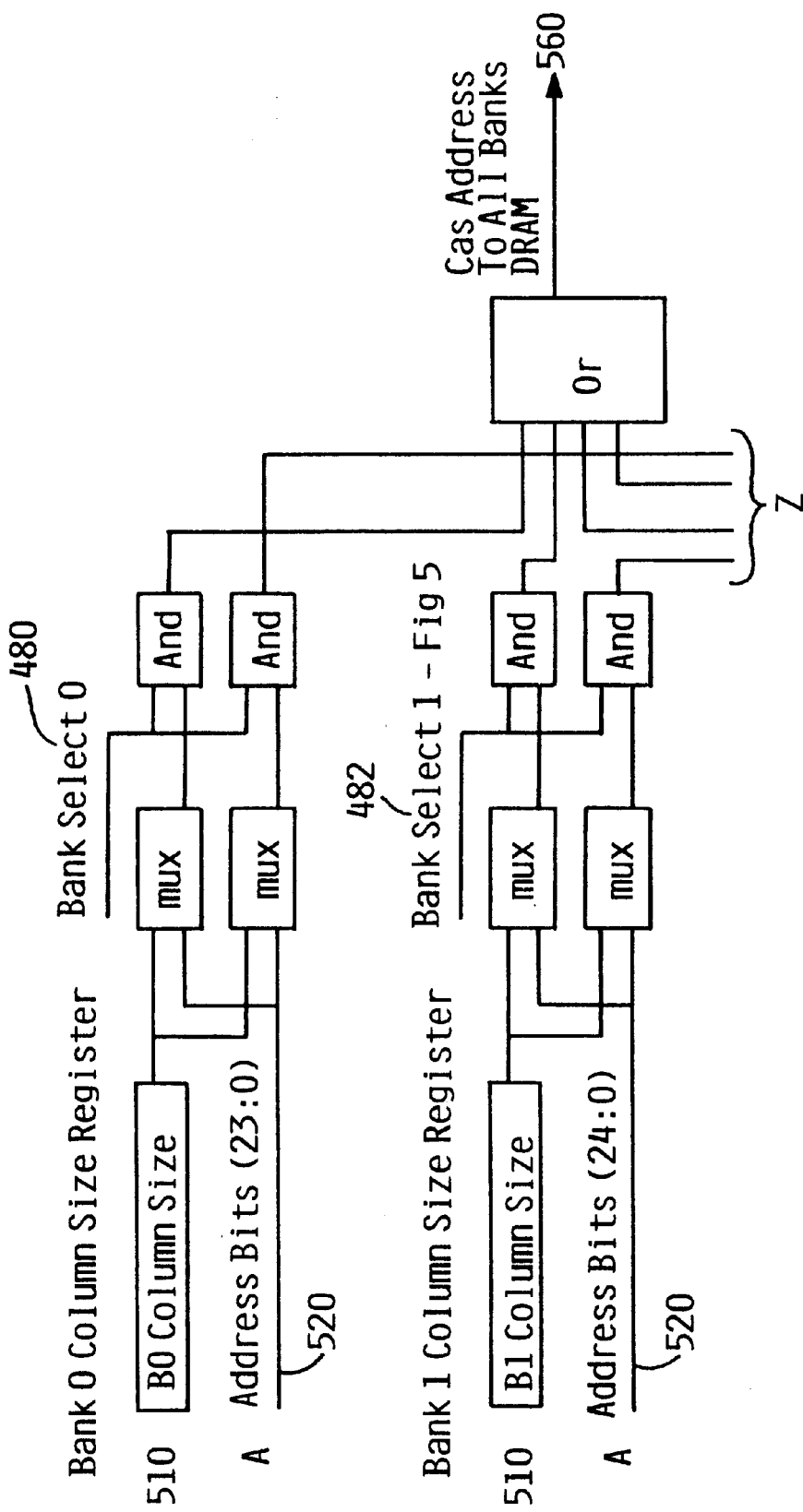
FIG. 5 is a simplified diagram of the address generation logic to determine the offset of a memory address in a selected memory bank in accordance with principles of the invention.
Figure 5B:
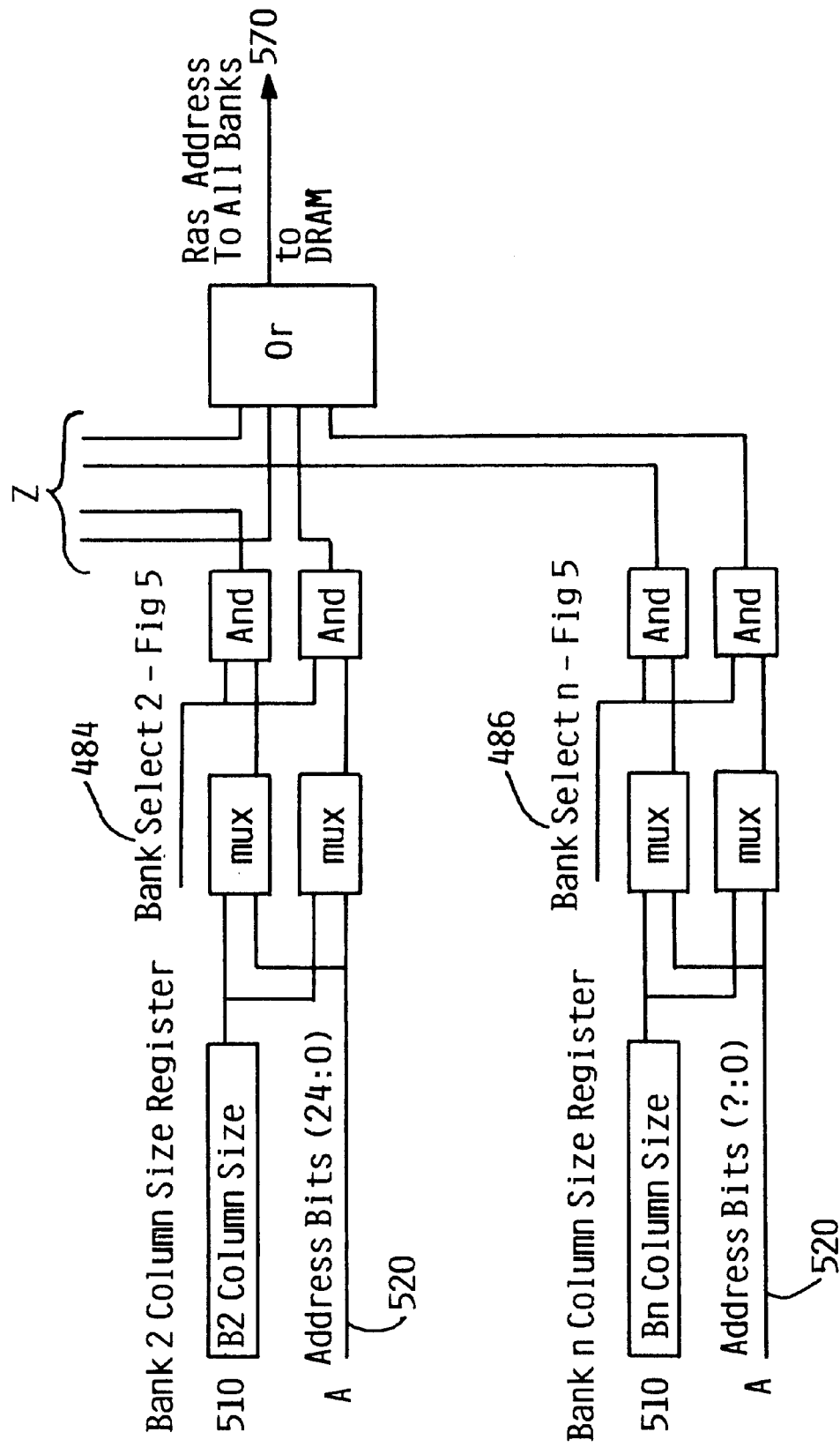

The arrangement of the address space within the memory banks is unique and is not contiguous. The bank address generation logic shown in FIG. 5 determines the unique address within the selected bank. For each bank in memory, the bank address generation logic comprises two inputs into an arrangement of multiplexers, whose output is then combined with the output signal from the bank select logic; one input 510 is the column size of the respective bank column size register, and another input 520 is the address A of the selected memory bus. The output of the multiplexers is combined with the Bank Select signal of each respective bank, e.g., 480, 482, 484 . . . 486. When a particular bank is selected, the column and row are multiplexed and output to the Column Address Select 560 and Row Address Select 570, respectively, of the selected memory bank. The bank address generation logic need only consider the lower significant bits that represent the size of the selected bank. These lower bits represent the offset of a particular memory address from the physical beginning of the bank.

Several examples best illustrate the method of addressing memory space. In the examples, which are not to be construed as limiting, an initial bank size of sixteen megabytes with subsequent banks of thirty-two megabytes, as shown in FIGS. 2 and 3, is extended to a total memory of four gigabytes. As a first example, suppose that address A at 30 MB is requested. The address of 30 MB is represented by bits 24:21 being on or high and all other bits being zero. The bank select logic of FIG. 4 need only consider bits 31:24 because if these bits are zero, the address is located in the first bank, Bank 0 in numerical order from the beginning of the bank. The bank select logic of FIG. 4 will select Bank 1 because all higher order bits other than bit 24 are zero; and 30 MB is larger than the size of Bank 0, sixteen megabytes, but is smaller than the combined sizes of Banks 0 and 1, which is forty-eight megabytes. Once the bank has been selected, then the bank address generation logic of FIG. 5 reviews only those bits representative of the selected bank's size. Bank 1 has a capacity of thirty-two megabytes, so bits 24:0 are considered and the sum of the enabled bits, 24:21, i.e., 16 MB+8 MB+4 MB+2 MB, is thirty megabytes. Thus, the address of 30 MB is offset thirty megabytes from the physical beginning of Bank 1.

As a second example, consider the thirty-two bit address 70 MB, which in binary representation is bits 26, 22, and 21 being on and all other bits being zero. Bank 2 having thirty-two megabytes would be selected because the number 70 is greater than the sum of all the preceding banks but is less than the sum of all the preceding banks and the current bank. In other words, bits 31:27 are not enabled and the highest order bit is bit 26 when the address is 70 MB. To determine the location of 70 MB in Bank 2, we again only look to the value of bits 24:0 that represent the thirty-two megabyte size of Bank 2 and note that only bits 21:20 are enabled. The sum of bits 21:20 is six megabytes so address 70 MB is offset 6 MB from the physical beginning of Bank 2.

A third example is an address 787 MB which in binary representation would mean that bits 29, 28, 24, 21, 20 are enabled and all other bits are zero. The bank select logic would choose Bank 25. Summing the bits 24:0, i.e., 16 MB (bit 24)+2 MB (bit 21)+1 MB (bit 20)=19 MB. Thus, an address of 787 MB would be offset 19 MB from the physical beginning of Bank 25.

By providing unique control of the address space to the memory's bank select and bank address generation logic and the addressing scheme disclosed herein, the problem of calculating address offsets to all memory modules is eliminated. Because there is no address manipulation, the data in these partitions are non-contiguous when viewed from top to bottom on the memory module.

While various embodiments of the present invention have been described above, it should be understood that they have been presented by way of example, and not limitation, and variations are possible. For instance, the invention accommodates different size banks within the memory. Thus, the breadth and scope of the present invention should not be limited by any of the above-described exemplary embodiments, but should be defined only in accordance with the following claims and their equivalents.

What is claimed is:

1. A method to arrange addresses in a memory system, comprising the steps of:
   (a) storing the total size of a plurality of contiguous memory banks and storing the size of each of said memory banks;
   (b) selecting one of said memory banks by reading the highest order bits above the bits representative of the size of the smallest memory bank; and
   (c) determining an offset position of an address in said selected memory bank from the physical beginning of the selected memory bank by summing the bits of lower order than the bit representing the size of the selected memory bank.

2. The method of claim 1 wherein the step of selecting one of said memory banks further comprises the step of determining if the highest order bits above the bit representative of the size of the smallest memory bank, placing the address in the first memory bank.

3. The method of claim 1 wherein the step of selecting one of said memory banks further comprises selecting said memory bank whose low address is less than or equal to said highest order bits and whose high address is greater than said highest order bits.

4. A computer system, comprising:
   (a) a computer processor,
   (b) a memory connected on a bus to said processor, said memory comprising a memory controller connected on a memory bus to a plurality of contiguous memory banks, each having a low address, a high address, and a physical beginning; said memory controller also having a plurality of registers storing the size of each of said memory banks to be used by bank select logic and address generation logic;

(c) a plurality of bus units connected to said processor and/or said memory via an external bus, said processor and or one of said bus units to request access to an address in said memory;

wherein said address is decoded by said bank select logic which reads the address bits that are of higher order than the size of the smallest of said plurality of memory banks and selects one of said plurality of memory banks whose low address is less than or equal to said address and whose high address is greater than said address; and wherein said address generation logic generates a position in said selected memory bank by summing the address bits of lower significance than the size of said selected bank and offsetting the sum from said physical beginning of said selected bank.

5. A memory system apparatus for the storage of and retrieval of binary data, comprising:

(a) means to read a requested binary address to access the memory system having a plurality of memory banks, each bank having a low address not necessarily coincident with the physical beginning of the memory bank and a high address;

(b) means to decode the bits of the binary address that are of higher order than the smallest of the memory banks in the memory system;

(c) means to select the memory banks whose low address is less than or equal to the higher order bits and whose high address is greater than the higher order bits;

(d) means to decode the bits of the binary address that are lower order than the bits representing the size of the selected memory bank;

(e) means to offset the requested binary address from the physical beginning of the selected memory bank by summing the bits of lower order; and (f) means to store data to or retrieve data from the offset in the selected memory bank.

* * * * *